(12) United States Patent
Adam (10) Patent No.: US 11,134,624 B2
(45) Date of Patent: Oct. 5, 2021

(54) TREE TAP AND METHOD OF USING SAME

(71) Applicant: Frederic Adam, Ste-Marie-Salome (CA)

(72) Inventor: Frederic Adam, Ste-Marie-Salome (CA)

( * ) Notice: Subject to any disclaimer, the term of this patent is extended or adjusted under 35 U.S.C. 154(b) by 235 days.

(21) Appl. No.: 16/455,131

(22) Filed: Jun. 27, 2019

(65) Prior Publication Data

US 2020/0015437 A1 Jan. 16, 2020

Related U.S. Application Data

(63) Continuation-in-part of application No. 16/383,063, filed on Apr. 12, 2019, now abandoned.

(60) Provisional application No. 62/697,747, filed on Jul. 13, 2018.

(51) Int. Cl.
*A01G 23/14* (2006.01)
*A01G 23/12* (2006.01)

(52) U.S. Cl.
CPC .............. *A01G 23/14* (2013.01); *A01G 23/12* (2013.01)

(58) Field of Classification Search
CPC ...... A01G 23/14; A01G 23/12; A01G 25/026; A01G 25/023; B26B 11/006; B26B 1/10; B26B 9/02
See application file for complete search history.

(56) References Cited

U.S. PATENT DOCUMENTS

| | | | | |
|---|---|---|---|---|
| 469,232 A * | 2/1892 | Currier | .................. | A01G 23/14 47/51 |
| 1,511,632 A | 2/1921 | Penska | | |
| 2,944,369 A * | 7/1960 | Soule | ..................... | A01G 23/10 47/52 |
| 3,204,370 A * | 9/1965 | Lamb | ..................... | A01G 23/14 47/52 |
| 3,596,402 A * | 8/1971 | Palmer | .................. | A01G 23/14 47/53 |
| 5,046,281 A * | 9/1991 | Murphy | .................. | A01G 7/06 47/57.5 |
| 8,677,682 B2 | 3/2014 | Cote et al. | | |
| 2013/0174478 A1* | 7/2013 | Cote | ...................... | A01G 23/14 47/11 |

FOREIGN PATENT DOCUMENTS

CA 2479982 3/2005

* cited by examiner

*Primary Examiner* — Timothy D Collins
*Assistant Examiner* — Brittany A Lowery (57) ABSTRACT

A method of inserting a tree tap into a tree, the tree tap including a blade in which a passageway is defined. The method includes abutting a distal end of the blade against an outer surface of the tree, followed by impacting the tree tap to drive the blade in to the tree. Afterwards, a cavity is drilled in the tree adjacent the blade distal end through the passageway. Also, a tree tap usable to perform the method.

14 Claims, 10 Drawing Sheets

TREE TAP AND METHOD OF USING SAME

FIELD OF THE INVENTION

The present invention relates to tree sap collection and is more particularly concerned with a tree tap and a method of using same.

BACKGROUND OF THE INVENTION

Tree sap, such as maple and birch sap, is collected to make edible products. For example, maple sap may be collected and then concentrated by evaporation to produce maple syrup. Conventional taps are inserted in the tree by first drilling a hole that may be for example about 7/16 of an inch in diameter and 2 to 2 ½ inches long. Then, a cylindrical tap is hammered in the aperture and tree sap can enter the tap for collection. A major disadvantage of this tapping technique is that after the tap is removed, typically 8-12 weeks after insertion, the hole is left open. This constitutes an injury to the tree.

It may take many years for the tree to repair the damage caused by the drilling process. This causes stress to the tree and can facilitate further damage, such as those caused by diseases or insects. Even if the tree heals properly, the tissue filling the hole in which the tap was inserted will be dead. Therefore, after many sap collection seasons, the flow of sap in the tree is highly impeded and the tree can no longer be used for sap collection, and may eventually die prematurely.

Against this background, there exists a need in the industry to provide novel methods and devices for tapping trees.

SUMMARY OF THE INVENTION

In a broad aspect, there is provided a tree tap for collecting sap from a tree, comprising: a blade insertable in the tree, the blade defining at least one sap collecting aperture; a dispenser for dispensing the sap, the dispenser defining an outlet; and an anvil provided between the blade and the dispenser. The tree tap defines a passageway between the at least one sap collecting aperture and the outlet.

There may also be provided a tree tap wherein the blade has at least a portion thereof that tapers in a direction leading away from the anvil.

There may also be provided a tree tap wherein the blade defines a blade first surface and a blade second surface, the blade first and second surfaces merging together at a blade distal end substantially opposed to the anvil.

There may also be provided a tree tap wherein the passageway is substantially rectilinear and defines a passageway longitudinal axis.

There may also be provided a tree tap wherein the blade distal end is laterally offset relative to the passageway longitudinal axis.

There may also be provided a tree tap wherein the blade first surface is substantially parallel to the passageway longitudinal axis and the at least one sap collecting aperture is defined in the blade second surface.

There may also be provided a tree tap wherein the anvil defines an impact receiving surface extending substantially perpendicular to the passageway longitudinal axis.

There may also be provided a tree tap wherein the dispenser includes a tube through which the passageway extends, the tube extending from the impact receiving surface.

There may also be provided a tree tap wherein the blade first and second surfaces merge together in a substantially straight edge.

There may also be provided a tree tap wherein the sap collecting aperture is proximally spaced apart from the blade distal end.

There may also be provided a tree tap wherein the blade includes a substantially wedge-shaped portion.

There may also be provided a tree tap wherein the dispenser includes a tube through which the passageway extends.

There may also be provided a tree tap wherein the tube defines a ribbed tube outer surface.

There may also be provided a tree tap wherein the blade is configured and sized to be driven into the tree by spreading apart and deforming tree fibers without requiring removal of wood from the tree prior to being driven thereinto.

There may also be provided a tree tap further comprising an auxiliary blade positionable in an abutment relationship relative to the blade and anvil, the auxiliary blade being configured for being removable from the tree with the blade remaining inserted in the tree.

There may also be provided a tree tap wherein wherein the anvil defines a flange protruding transversally relative to the blade.

There may also be provided a tree tap wherein the blade is self-penetrating.

In an other broad aspect, there is provided a method for driving a tree tap in a tree defining a tree outer surface, the tree tap defining an impact receiving surface, a blade extending away from the impact receiving surface and terminating in a blade distal end, a dispenser extending away from the impact receiving surface opposed to the blade and a passageway extending between the blade and the dispenser, the passageway being open in the blade and in the dispenser, the method comprising: abutting the blade distal end against the tree outer surface; and impacting the impact receiving surface towards the blade to drive the blade in to the tree; wherein the blade penetrates the tree by spreading and deforming tree fibers.

There may also be provided a method wherein the blade is self-piercing so that no aperture or recess is formed in the tree to receive the blade prior to driving the blade into the tree.

There may also be provided a method wherein the passageway is substantially rectilinear, the method further comprising drilling a cavity in the tree adjacent the blade distal end through the passageway after the blade is inserted in the tree.

There may also be provided a method further comprising collecting sap from the tree through the passageway.

In yet another broad aspect, there is provided a tree tap for collecting sap from a tree, comprising: a blade insertable in the tree, the blade defining at least one sap collecting aperture; and a dispenser for dispensing the sap, the dispenser defining an outlet; the tree tap defining a passageway between the at least one sap collecting aperture and the outlet; wherein the blade is self-penetrating so that the blade is drivable into the tree by impacting the tree tap when the blade is abutted against the tree.

There may also be provided a tree tap further comprising an anvil provided between the blade and the dispenser.

There may also be provided a tree tap wherein the blade has at least a portion thereof that tapers in a direction leading away from the anvil.

There may also be provided a tree tap wherein the blade defines a blade first surface and a blade second surface, the blade first and second surfaces merging together at a blade distal end substantially opposed to the anvil.

There may also be provided a tree tap wherein the passageway is substantially rectilinear and defines a passageway longitudinal axis.

There may also be provided a tree tap wherein the outlet and the sap collecting aperture are both substantially centered relative to the passageway longitudinal axis.

There may also be provided a tree tap wherein the blade distal end is laterally offset relative to the passageway longitudinal axis.

There may also be provided a tree tap wherein the blade first surface is substantially parallel to the passageway longitudinal axis and the at least one sap collecting aperture is defined in the blade second surface.

There may also be provided a tree tap wherein the anvil defines an impact receiving surface extending substantially perpendicular to the passageway longitudinal axis.

There may also be provided a tree tap wherein the dispenser includes a tube through which the passageway extends, the tube extending from the impact receiving surface.

There may also be provided a tree tap wherein the blade first and second surfaces merge together in a substantially straight edge at the blade distal end.

There may also be provided a tree tap wherein the sap collecting aperture is proximally spaced apart from the blade distal end.

There may also be provided a tree tap wherein the dispenser includes a tube through which the passageway extends, the tube defining a ribbed tube outer surface.

There may also be provided a tree tap wherein the blade is configured and sized to be driven into the tree by spreading apart and deforming tree fibers without requiring removal of wood from the tree prior to being driven thereinto.

There may also be provided a tree tap further comprising an auxiliary blade positionable in an abutment relationship relative to the blade and anvil, the auxiliary blade being configured for being removable from the tree with the blade remaining inserted in the tree.

There may also be provided a tree tap wherein the anvil defines a flange protruding transversally relative to the blade.

There may also be provided a tree tap wherein the passageway is substantially rectilinear between the sap collecting aperture and the outlet.

There may also be provided a tree tap wherein the passageway also defines a passageway auxiliary portion extending from the passageway main portion at an angle 5 relative thereto and leading to the outlet, the tree tap also defining an auxiliary aperture leading substantially coaxially into the passageway main portion substantially opposed to the sap collecting aperture.

There may also be provided a tree tap wherein the passageway auxiliary portion extends from the passageway main portion between the sap collecting aperture and the auxiliary aperture, the passageway being substantially L-shaped between the sap collecting aperture and the outlet.

There may also be provided a tree tap further comprising a cap for selectively obstructing the auxiliary aperture.

There may also be provided a tree tap wherein the blade distal end is laterally offset relative to the passageway longitudinal axis.

In yet another broad aspect, there is provided a method for driving a tree tap in a tree defining a tree outer surface, the tree tap including a blade terminating at a blade distal end, a dispenser opposed to the blade, and a passageway extending between the blade and the dispenser, the passageway being open in the blade and in the dispenser, the method comprising: abutting the blade distal end against the tree outer surface; and impacting the tree tap to drive the blade in to the tree; wherein the blade penetrates the tree by spreading and deforming tree fibers.

There may also be provided a method wherein the blade is self-penetrating so that no aperture or recess is formed in the tree to receive the blade prior to driving the blade into the tree.

There may also be provided a method wherein the passageway is substantially rectilinear, the method further comprising drilling a cavity in the tree adjacent the blade distal end through the passageway after the blade is inserted in the tree.

There may also be provided a method further comprising collecting sap from the tree through the passageway.

Advantageously, the tree is less injured using the proposed tree tap than when the conventional tapping procedure is used. This leads to an increase in the useful life of the tree. Also, since injury to the tree is reduced, one may even have more taps inserted in the tree than when using conventional taps, thereby increasing the productivity of the sap collection.

The present application is a continuation-in-part of U.S. patent application Ser. No. 16/383,063 filed Apr. 12, 2019, which claims benefit from U.S. provisional patent application 62/697,747 filed Jul. 13, 2018. The contents of both of these applications being hereby incorporated by reference in its entirety.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 3, in a side cross-sectional view midway therethrough, illustrates the tree tap of FIG. 1;

FIG. 7, in a perspective cross-sectional view, illustrates the tree tap of FIG. 6;

FIG. 8, in a perspective view, illustrates an auxiliary blade usable with the tree taps of FIGS. 4 to 7;

FIG. 10, in a perspective view, illustrates a tree tap in accordance with yet another embodiment of the present invention;

FIG. 11, in an alternative perspective view, illustrates the tree tap of FIG. 10;

FIG. 12, in side elevation view, illustrates the tree tap of FIGS. 10 and 11;

FIG. 13, in top cross-sectional view midway therethrough, illustrates the tree tap of FIGS. 10 to 12;

FIG. 18, in a perspective view, illustrates a tree tap in accordance with yet another embodiment of the present invention;

FIG. 19, in an alternative perspective view, illustrates the tree tap of FIG. 18; and FIG. 20, in a side cross-sectional view midway therethrough, illustrates the tree tap of FIGS. 18 and 19.

DETAILED DESCRIPTION

Terms such as "substantially", "about" and "essentially" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Also, directional terminology, such as bottom, top, distal and proximal, refers to the tree tap of the invention when used in a typical orientation, inserted in a tree growing generally vertically. In this case, distal refers to parts of the tree tap that are deeper in the tree. This reference configuration is for reference and convenience purposes and should not be used to restrict the scope of the claims unless explicitly required by the structure of a specific claim. Notably, the proposed tree tap is usable in non-vertically growing trees or non-vertical portions of trees, such as for example branches.

Figure 1:
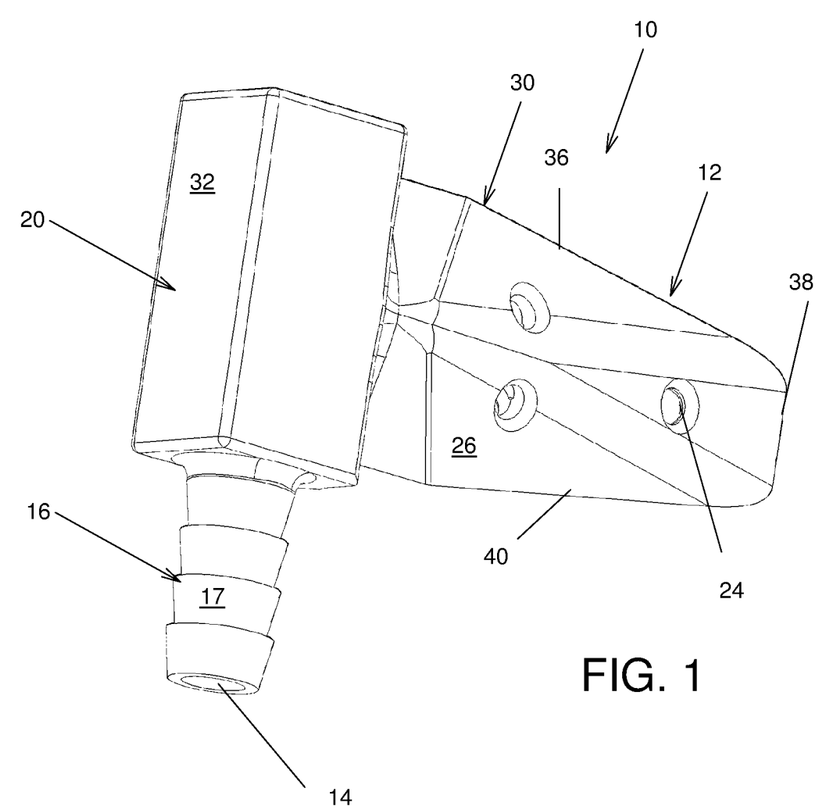
FIG. 1, in a perspective view, illustrates a tree tap in accordance with an embodiment of the present invention.

Referring to FIG. 1, there is shown a tree tap 10 in accordance with an embodiment of the present invention. The tree tap 10 includes a blade 12 insertable in a tree 13 (shown in FIGS. 14 to 17), a dispenser 16 for dispensing the collected sap (not shown in the drawings) and an anvil 20 extending therebetween. In use the blade 12 may be completely or only partially inserted in the tree 13. The blade 12 has at least a portion thereof that tapers in a direction leading away from the anvil 20. For example, the blade 12 includes a substantially wedge-shaped distal portion, and in some embodiments is entirely substantially wedge-shaped.

Figure 3:
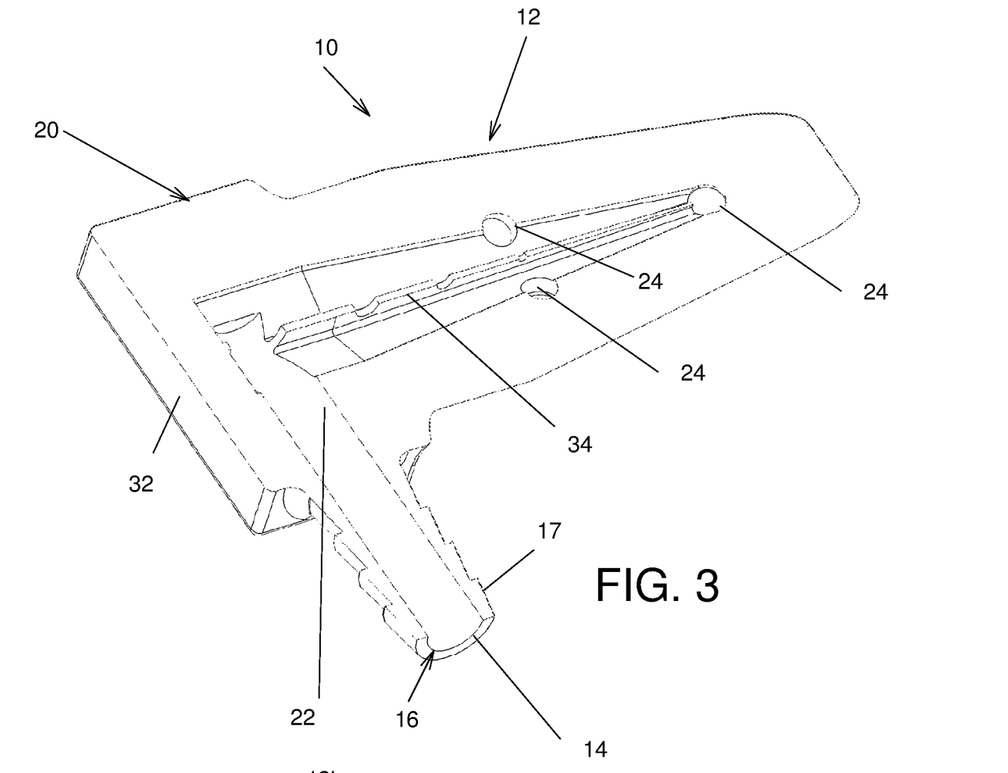
Figure 4:
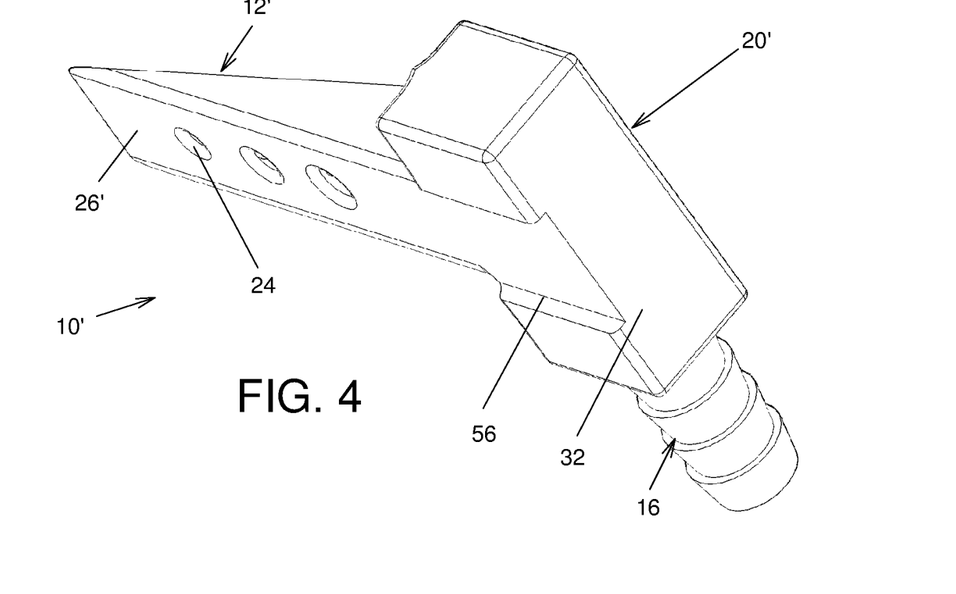
FIG. 4, in a perspective view, illustrates a tree tap in accordance with another embodiment of the present invention.
Figure 5:
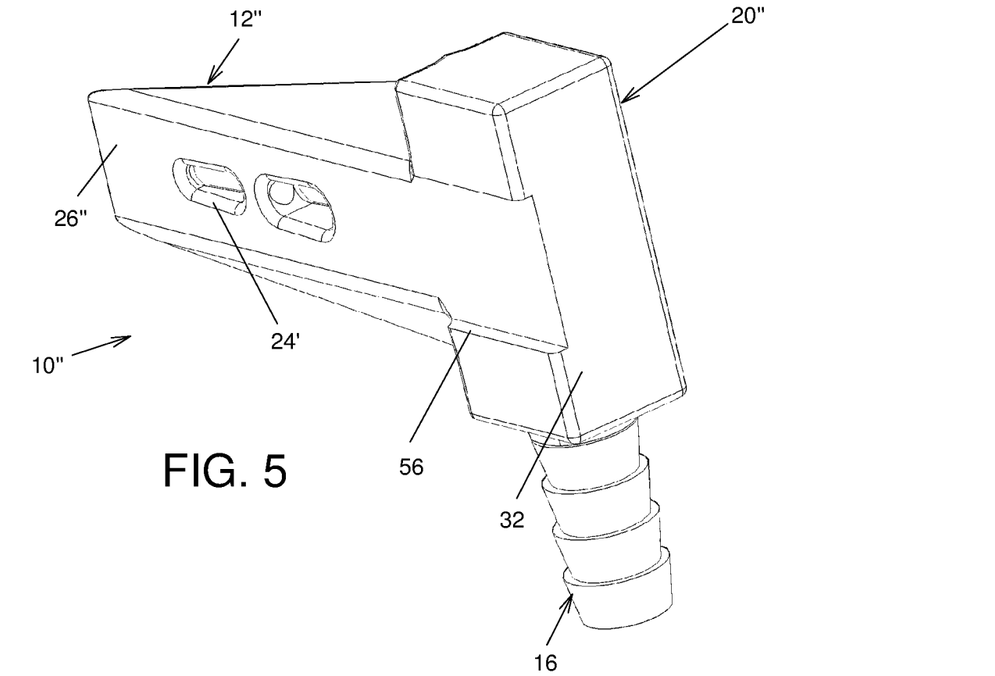
FIG. 5, in a perspective view, illustrates a tree tap in accordance with yet another embodiment of the present invention.

As seen in FIG. 3, the tree tap 10 defines a passageway 22 between the blade 12 and dispenser 16. The blade 12 defines one or more sap collecting apertures 24 leading to the passageway 22. In some embodiments, the blade 12 tapers in a direction leading away from the anvil 20 and is configured and sized to be driven in the tree by spreading apart and deforming the tree fibers without requiring removal of wood from the tree. In other words, the tree tap 10 is self-penetrating, or self-piercing. In other embodiments, only a small portion of the tree may be removed, that is smaller than the tree tap 10, prior to driving the blade 12 in the tree 13. In yet other embodiments, an incision is made in the tree prior to insertion.

Figure 2:
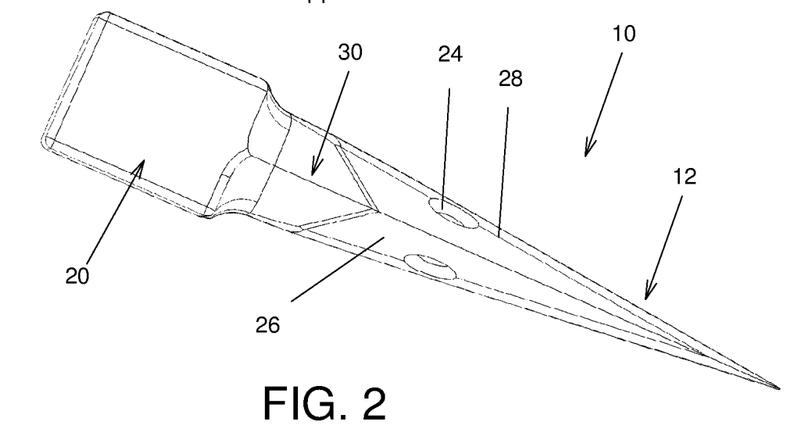
FIG. 2, in a top elevation view, illustrates the tree tap of FIG. 1.

As better seen in FIG. 2, the blade 12 is for example generally flattened, that is one of its transversal dimension is much larger than the other one, and defines a pair of opposed blade first and second surfaces 26 and 28 extending from the anvil 20. The sap collecting apertures 24 are provided in the blade first and second surfaces 26 and 28. The blade first and second surfaces 26 and 28 merge together at a blade peripheral edge 30, extending generally along the top, distal and bottom portions 36, 38 and 40 of the blade 12. In some embodiments, the blade first and second surfaces 26 and 28 merge together at an acute angle relative to each other. In some embodiments, the blade peripheral edge 30 is relatively sharp so as to facilitate insertion of the blade 12 in the tree. However, the blade peripheral edge 30 may be a dull edge or, in some embodiments, flat or curved so that the blade first and second surfaces 26 and 28 don't merge directly at an acute angle relative to each other (not shown in the drawings). Other shapes for the blade first and second surfaces 26 and 28 are also within the scope of the invention.

In some embodiments, the blade 12 is relatively narrow in a sideways direction when inserted in the tree, so as to minimize interference with sap flow through the tree once the blade 12 has been removed. The blade 12 may be relatively tall however, to facilitate sap collection. In some embodiments, the blade 12 is however relatively wide and/or relatively short vertically. One or more of the blade first and second surfaces 26 and 28 may be generally convex, either with a relatively smooth surface, or with a few substantially planar facet that define a generally convex shape. Other shapes for the blade first and second surfaces 26 and 28 are also within the scope of the invention. For example, as detailed below, one or both of the blade first and second surfaces 26 and 28 may be substantially flat.

Returning to FIG. 1, the blade 12 extends from the anvil 20. The anvil 20 is shaped to receive impacts thereonto to drive the blade 12 into the tree. For example, the anvil 20 defines an impact receiving surface 32 substantially opposed and perpendicular to the blade 12. The impact receiving surface 32 is typically substantially flat, but other shapes are within the scope of the invention.

The dispenser 16 extends from the anvil 20, for example at the bottom thereof. In some embodiments, the dispenser 16 takes the form of a tube having a ribbed tube outer surface 17 and defining an outlet 14 in fluid communication with the passageway 22 for securely receiving thereonto a conventional collection tube (not shown in the drawings). Thus, as seen in FIG. 3, the passageway 22 extends between the at least one sap collecting aperture 24 and the outlet 14. In other embodiments, the dispenser 16 includes a hook or other means for suspending a conventional bucket below the outlet 14. In yet other embodiments, the dispenser 16 takes any other suitable form allowing collection of sap from the passageway 22.

The passageway 22 has any suitable shape. In some embodiments, the passageway 22 is provided with one or more internal reinforcement ribs 34 extending thereacross, especially in the blade 12. In other embodiments, the reinforcement ribs 34 are omitted. In a specific embodiment, the passageway 22 has a generally L-shaped configuration, but other configurations are within the scope of the invention.

In the embodiment of FIGS. 1 to 3, the tree tap 10 does not require any other device except for a hammer or mallet (now shown in the drawings) to be used and driven into the tree. In such embodiments, the tree tap 10 is made of a material that is sufficiently tough to withstand the insertion process detailed below, such as a suitable metal or polymer, among other possibilities. In such embodiments, the distal portion 38 is positioned abutting against the bark 19 of the tree to tap, with the top and bottom portions 36 and 40 substantially vertically aligned relative to each other, for a tree having a generally vertical trunk. Then, using the hammer or mallet, the impact surface is repeatedly hit with enough force that the blade 12 penetrates in the tree 13 by spreading apart and deforming the wood fibers. In some embodiments, no recess or aperture needs to be formed in the tree prior to this process. However, in some embodiments, a small slit or other aperture or recess may be formed to guide insertion of the tree tap 10. This recess or aperture has however a much smaller volume than the blade 12. Other means of providing the impacts required for penetration of the blade 12 in the tree are also usable, such as, non-limitingly, an impact drill 66.

Once inserted, sap will be collected through the sap collecting apertures 24. After the sap collecting season is over, the tree tap 10 is simply removed from the tree. Fiber resiliency and internal pressure in the tree may then cause complete or partial closing of the aperture left by the tree tap 10.

FIGS. 4 to 7 illustrate alternative tree taps 10', 10" and 10''', respectively in FIGS. 4, 5, and 6 and 7. These tree taps 10', 10" and 10''' could, if made of a suitable material, be used similarly to the tree tap 10. However, in some embodiments, the tree taps 10', 10" and 10''' are usable in combination with an auxiliary blade 42, seen in FIGS. 8 and 9. The auxiliary blade 42 allows using the invention with tree taps 10', 10" and 10''' that are made of softer or more brittle materials and which could not by themselves withstand the impacts required to insert the tree taps 10', 10" and 10''' in the tree 13. As such, the auxiliary blade 42 is typically made of a suitable metal.

Figures 7, 8:
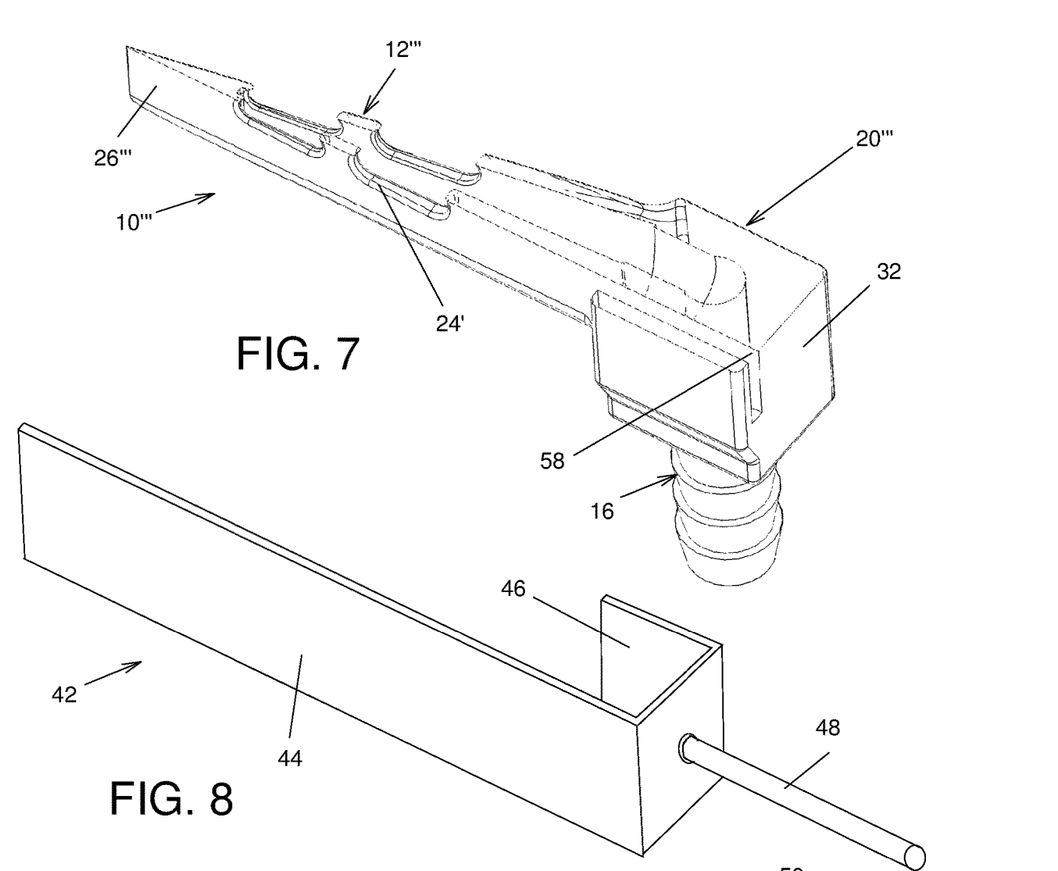
Figure 9:
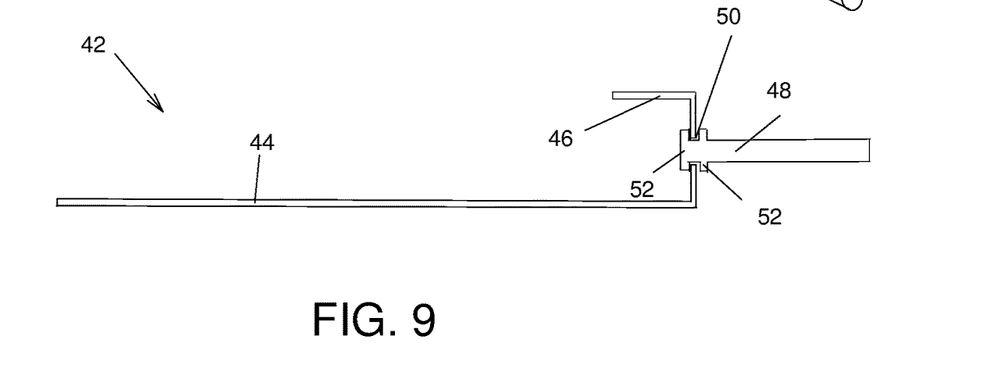
FIG. 9, in top plan view, illustrates the auxiliary blade of FIG. 8.
Figures 10, 11:
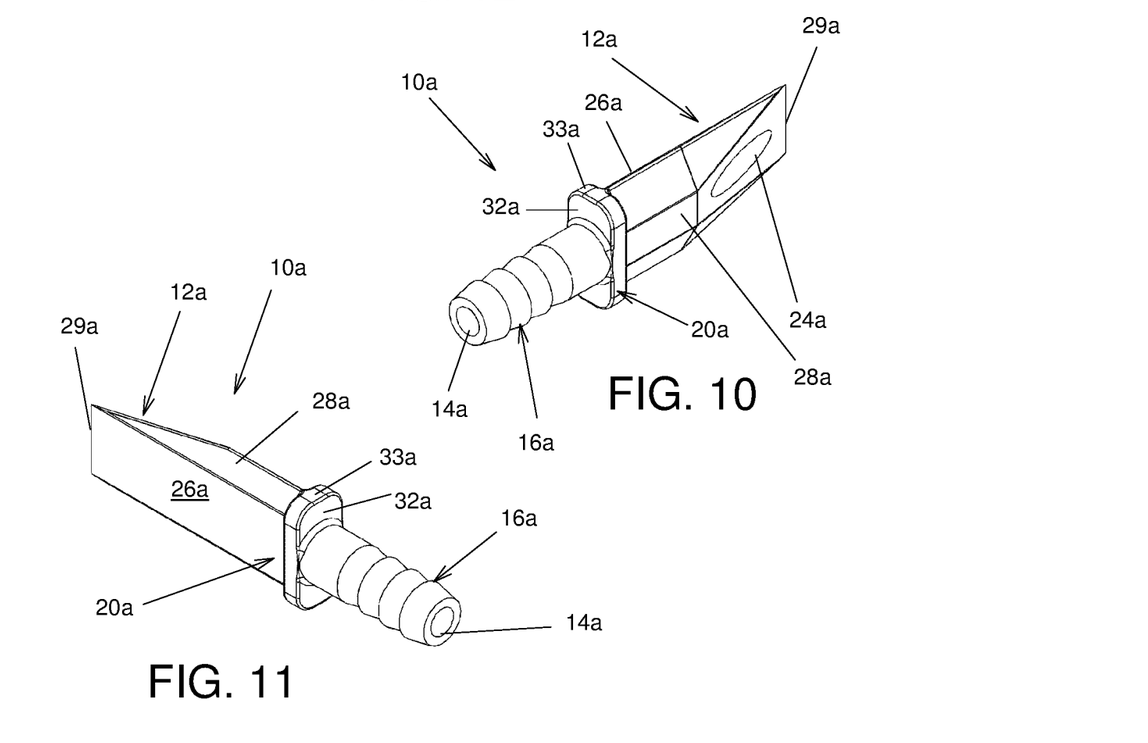
Figure 12:
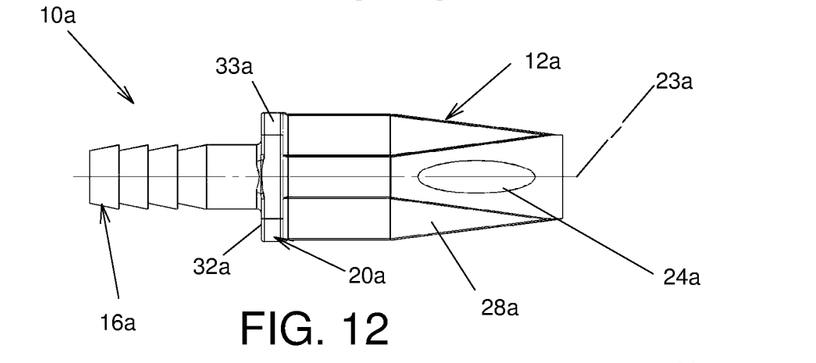

The auxiliary blade 42 is positionable in an abutment relationship relative to the blades 12', 12" and 12''' and anvils 20', 20" and 20''' of respectively the tree taps 10', 10" and 10'''. The auxiliary blade 42 is configured for being removable from the tree 13 with the blade 12', 12" and 12''' remaining inserted in the tree 13. The auxiliary blade 42 includes an auxiliary blade portion 44, an anchoring portion 46 extending from the auxiliary blade portion 44, and a stem 48 extending from the anchoring portion 46 for coupling to an impact drill 66 or a similar tool. The stem 48 is typically axially rotatable relative to the anchoring portion 46. The auxiliary blade portion 44 is for abutting against the blade 12', 12" or 12''' of respectively the tree taps 10', 10" and 10''' and extending substantially parallel thereto. The anchoring portion 46 is configured for anchoring the auxiliary blade 42 to the tree taps 10', 10" and 10''', for example by fitting over and abutting against the respective anvils 20', 20" or 20''' thereof. The stem 48 extend perpendicular to the impact receiving surface 32.

For example, the auxiliary blade 42 takes the form of a substantially rectangular strip of metal that has been suitably folded and to which the stem 48 is secured. The strip of metal has been folded to form a generally U-shaped anchoring portion 46 that conforms to the shape of the anvil 20', 20" or 20''', from which a substantially flat auxiliary blade portion 44 extends from one of the sides of the U-shaped anchoring portion 46. An aperture 50, seen in FIG. 9, is provided in the anchoring portion 46, in the portion thereof facing the impact receiving surface 32, and the stem 48 is mounted in the aperture 50 to be rotatable thereabout. For example the stem 48 defines a pair of flanges 52 of diameter larger than the aperture 50, the flanges 52 being provided on a respective side of the aperture 50.

Figure 6:
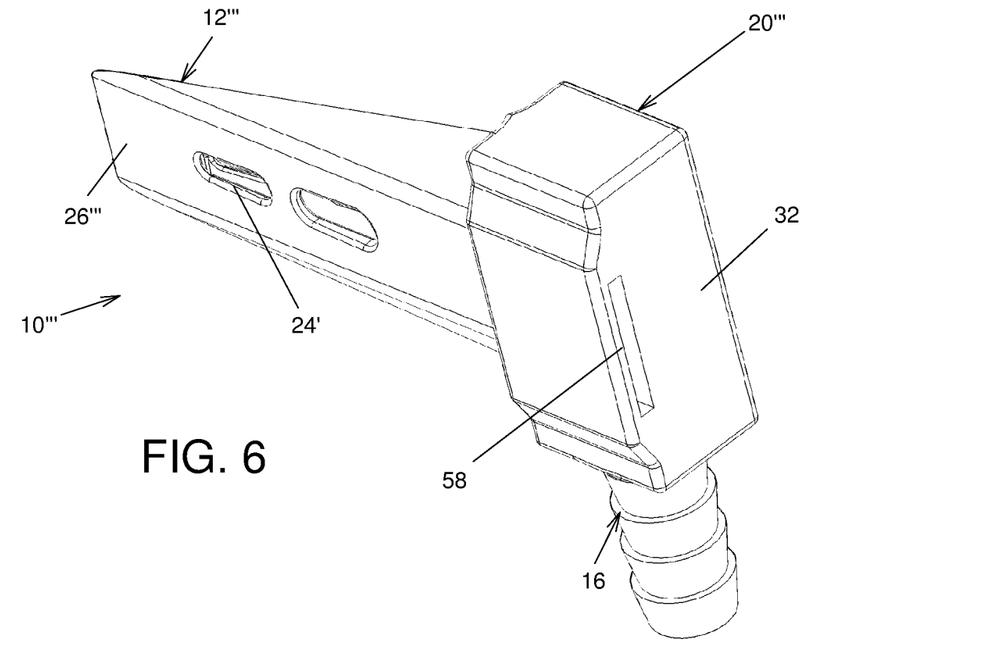
FIG. 6, in a perspective view, illustrates a tree tap in accordance with yet another embodiment of the present invention.

Returning to FIGS. 4 to 7, in some embodiments, the blade first surface 26', 26" and 26''' of respectively the blades 12', 12" and 12''' is substantially flat. A notch 56 is provided in the anvils 20' and 20" and receives the part of the anchoring portion 46 that is in prolongation of the auxiliary blade portion 44 to maintain alignment between the tree tap 10 and the auxiliary blade 42. In the anvil 20''', as seen in FIGS. 6 and 7, the notch 56 is replaced by an aperture 58 extending from the impact receiving surface 32 to the blade 12''' that is shaped similarly to a portion of the anchoring portion 46 to be inserted thereinto. In both cases, the goal is to maintain the blade 12', 12" and 12''' substantially parallel, adjacent and in abutment with the auxiliary blade 42. To that effect, the notch 56 or aperture 58 has typically a height and a thickness substantially similar to that of the auxiliary blade 42. For example the notch 56 or aperture 58 receives the auxiliary blade 42 substantially snugly. In use, the stem 48 is inserted in an impact drill 66 with the auxiliary blade 42 positioned over the tree tap 10', 10" or 10''', and the impacts made by the hammer or mallet are replaced by the impacts of the impact drill 66. Once the tree tap 10', 10" or 10''' has been properly inserted, the auxiliary blade 42 is removed.

The number and shape of sap collecting apertures 24 can vary. For example the tree taps 10 and 10' have 6 round sap collecting apertures 24. The tree taps 10" and 10''' have 4 oval-shaped sap collecting apertures 24'. Other numbers and shape of sap collecting apertures are also within the scope of the invention.

Figure 13:
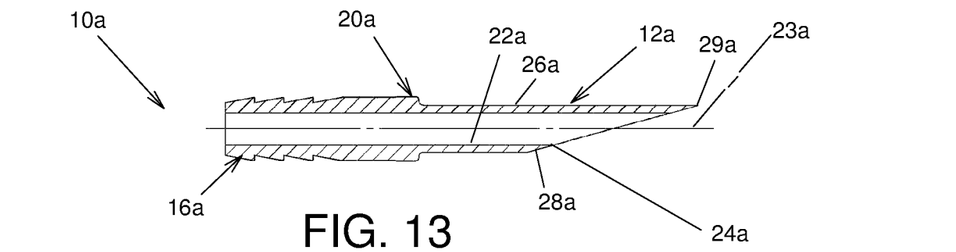

FIGS. 10 to 13 illustrate yet another embodiment of a tree tap 10a. In this tree tap 10a, the blade first and second surfaces 26a and 28a of the blade 12a merge together at a blade distal end 29a substantially opposed to the anvil 20a. For example, the blade first and second surfaces 26a and 28a merge together in a substantially straight edge at the blade distal end 29a. In other examples, the blade may be pointed. Accordingly, in some embodiments the term "blade" is to be construed broadly as including pointed or otherwise shaped portions of the claimed tree tap that enters the tree 13 in use. As seen in FIG. 13, the passageway 22a of the tree tap 10a is substantially rectilinear and defines a passageway longitudinal axis 23a. In some embodiments, the sap collecting aperture 24a is proximally spaced apart from the blade distal end 29a. To that effect, the blade distal end 29a is laterally offset relative to the passageway longitudinal axis 23a. For example, the blade first surface 26a is substantially parallel to the passageway longitudinal axis 23a and the at least one sap collecting aperture 24a is defined in the blade second surface 28a. Also, the dispenser 16a takes the form of a tube through which the passageway 22a extends, the tube extending from the impact receiving surface 32a. In this embodiment, a straight passage is created between outside the tree 13 and inside the tree 13. In some embodiments, the anvil 20a defines a flange 33a protruding transversally relative to the blade 12a and the dispenser 16a, the flange 33a defining part of the impact receiving surface 32a. Typically, the impact receiving surface 32a is substantially perpendicular to the passageway longitudinal axis 23a.

Figure 14:
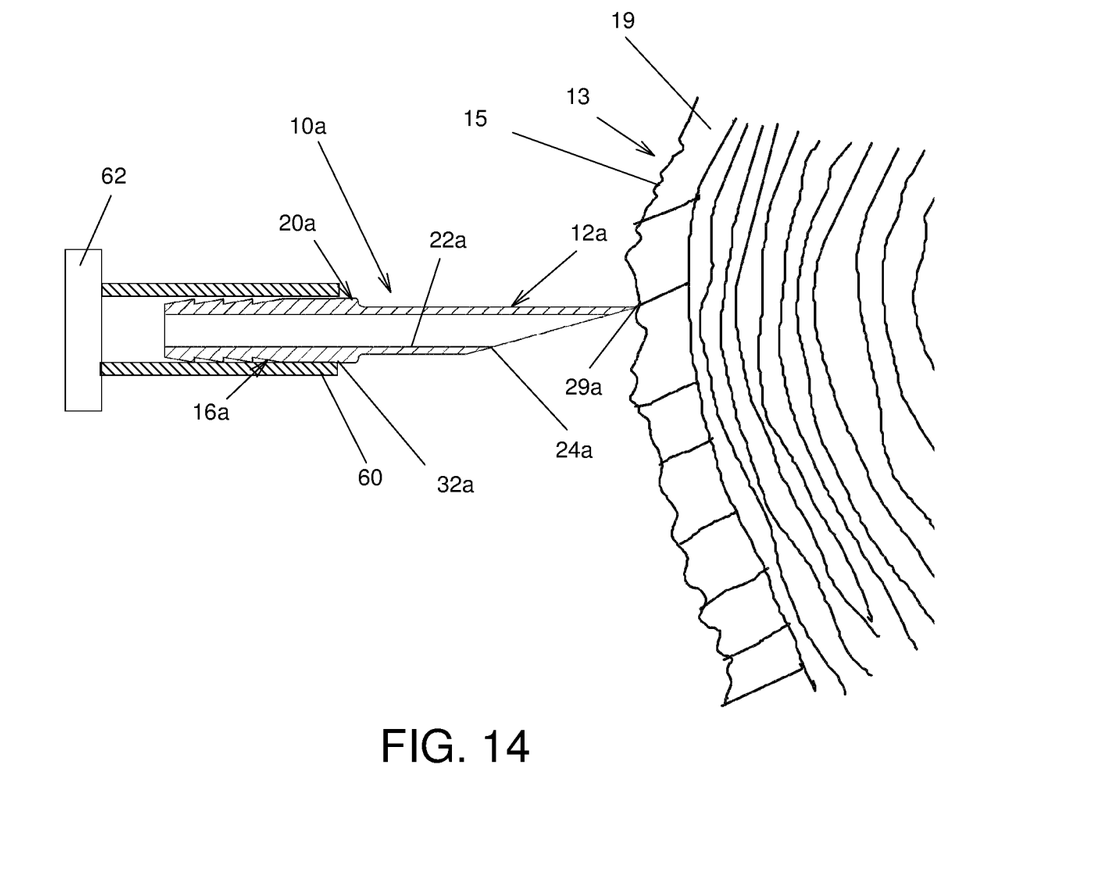
FIG. 14, in a top cross-sectional view, illustrates a step in an example of use of the tree tap of FIGS. 10 to 13.

FIGS. 14 to 17 illustrate a method for driving the tree tap 10a in a tree 13 defining a tree outer surface 15, typically defined by the bark 19 of the tree. As seen in FIG. 14, the method starts by abutting the blade distal end 29a against the tree outer surface 15 and then impacting the impact receiving surface 32a towards the blade 12a to drive the blade 12a in to the tree 13. For example, a hollow shank 60 is mounted to an impact drill 66, the latter being represented schematically in the drawings, and the shank 60 is inserted over the dispenser 16a until the shank 60 abuts against the impact receiving surface 32a. The impact drill 66 can then be used to repeatedly impact the impact receiving surface 32a. Other manners of driving the blade 12a into the tree 13 are also within the scope of the claimed invention, for example the alternatives mentioned hereinabove with respect to the other versions of the tree tap. The blade 12a then penetrates the tree 13 by spreading and deforming tree fibers. Typically, the blade 12a is self-piercing so that no aperture or recess is formed in the tree 13 to receive the blade 12a prior to driving the blade 12a into the tree 13. However, in some embodiments, a small slit of a volume and depth much smaller than the blade 12a may be made to guide insertion of the blade 12a, as mentioned above.

Figure 15:
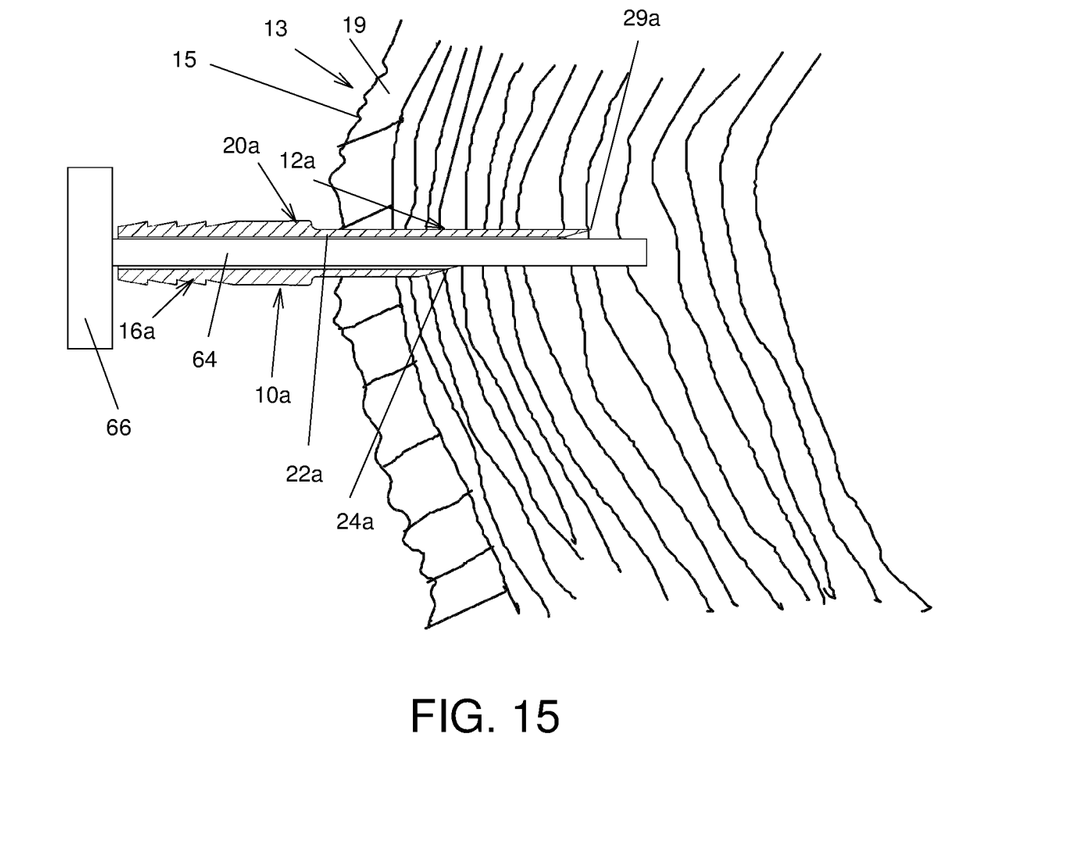
FIG. 15, in a top cross-sectional view, illustrates an other step in an example of use of the tree tap of FIGS. 10 to 13.
Figure 16:
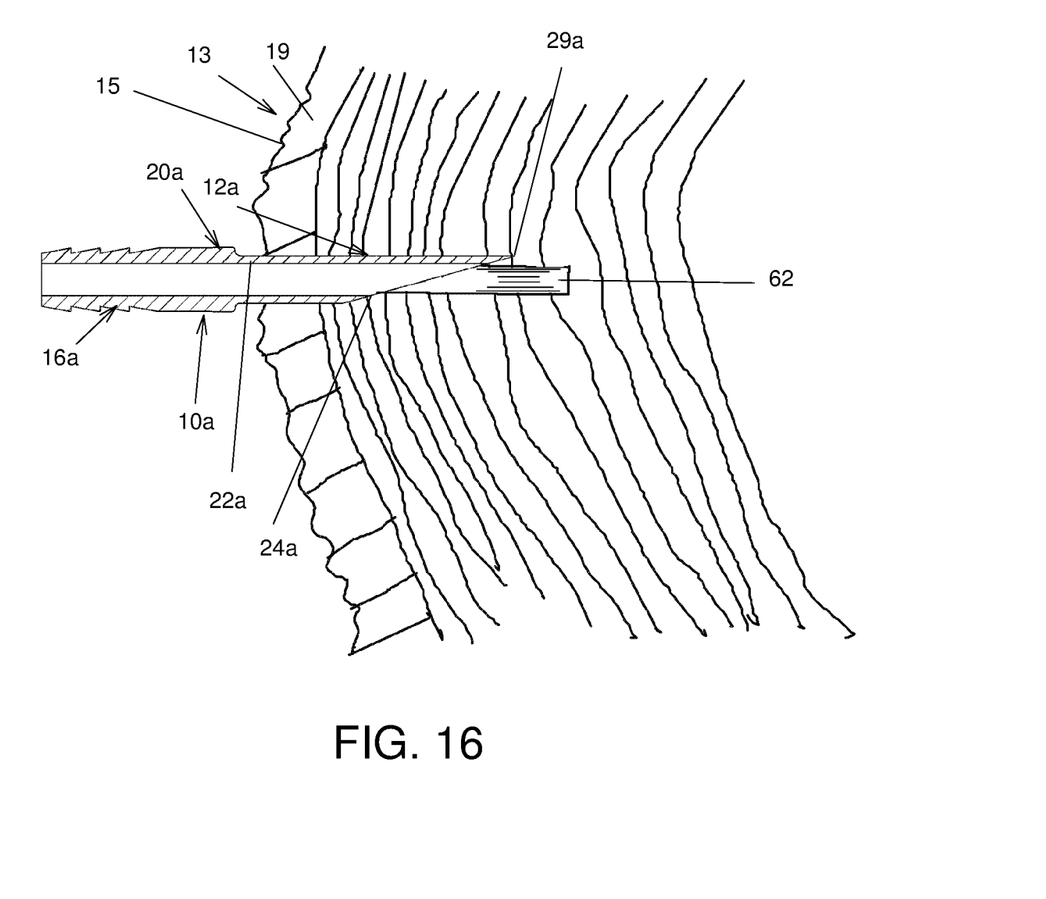
FIG. 16, in a top cross-sectional view, illustrates yet an other step in an example of use of the tree tap of FIGS. 10 to 13.

Referring to FIG. 15, in some embodiments, after the blade 12a has been driven into the tree 13, a bit 64 mounted to a drill 66 is then inserted through the passageway 22a to drill a cavity 62 (seen in FIG. 16) in the tree 13 adjacent the blade distal end 29a through the passageway 22a. It should be notes that the bit 64 only removes tree tissues from the tree 13 from within the tree 13. Closer to the tree outer surface 15, most or all the tree tissues have only been spread apart, not removed, from the tree 13, in opposition to conventional tree tapping techniques. Also, the diameter of the cavity 62 can be smaller than the diameter of tree tapping holes drilled conventionally. Indeed, in conventional drilling, the aperture must match the outside diameter of the tree tap, while in the present invention, is it this inside diameter, ie the diameter of the passageway 22a that is matched. It was discovered that removing small portion of tree tissue adjacent the sap collecting aperture 24a resulted in better sap collection performance. This removal is made possible because of the rectilinear shape of the passageway 22a and of the alignment between the sap collecting aperture 24a and the outlet 16a. Sap will then fill the cavity 62 and can be removed from the tree through the passageway 22a.

Figure 17:
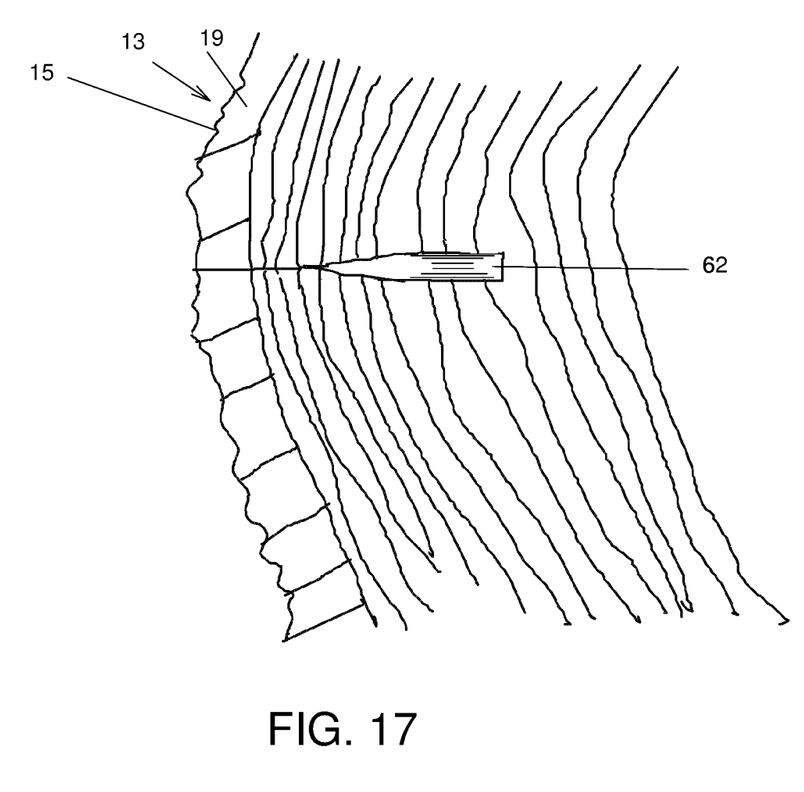
FIG. 17, in a top cross-sectional view, illustrates yet an other step in an example of use of the tree tap of FIGS. 10 to 13.

Once the sap collecting season is over, a hammer or a similar tool can be used to pry the tree tap 10a out of the tree 22a, for example by inserting the hammer between the tree 13 and the flange 33a. In some embodiments, the bark 15 is protected with, for example, a rubber panel during this operation. Then, as seen in FIG. 17, the aperture made in the tree 13 by the blade 12a can close and only the cavity 62 remains open in the tree. Since this cavity 62 is away from the tree outer surface 15, insects and other tree parasites will not easily occupy the cavity 62 and the tree 13 can heal faster than when a conventional tree tap is used.

For example, and non-limitingly, the tree tap 10 can be inserted so that the sap collecting aperture 24a has its proximal end about 1 cm deep into the tree 13. In a specific embodiment, the passageway 22a has a diameter of about 4.8 mm, the overall length of the tree tap 10a is about 70 mm, the longitudinal extension of the sap collecting aperture 24a is about 17.3 mm and the blade 12a tapers over a length of about 25.4 mm. The cavity 62 may have a length of about 30 to 50 mm. However, other dimensions for the tree tap 10 and the cavity 62 are within the scope of the invention.

Figures 18, 19:
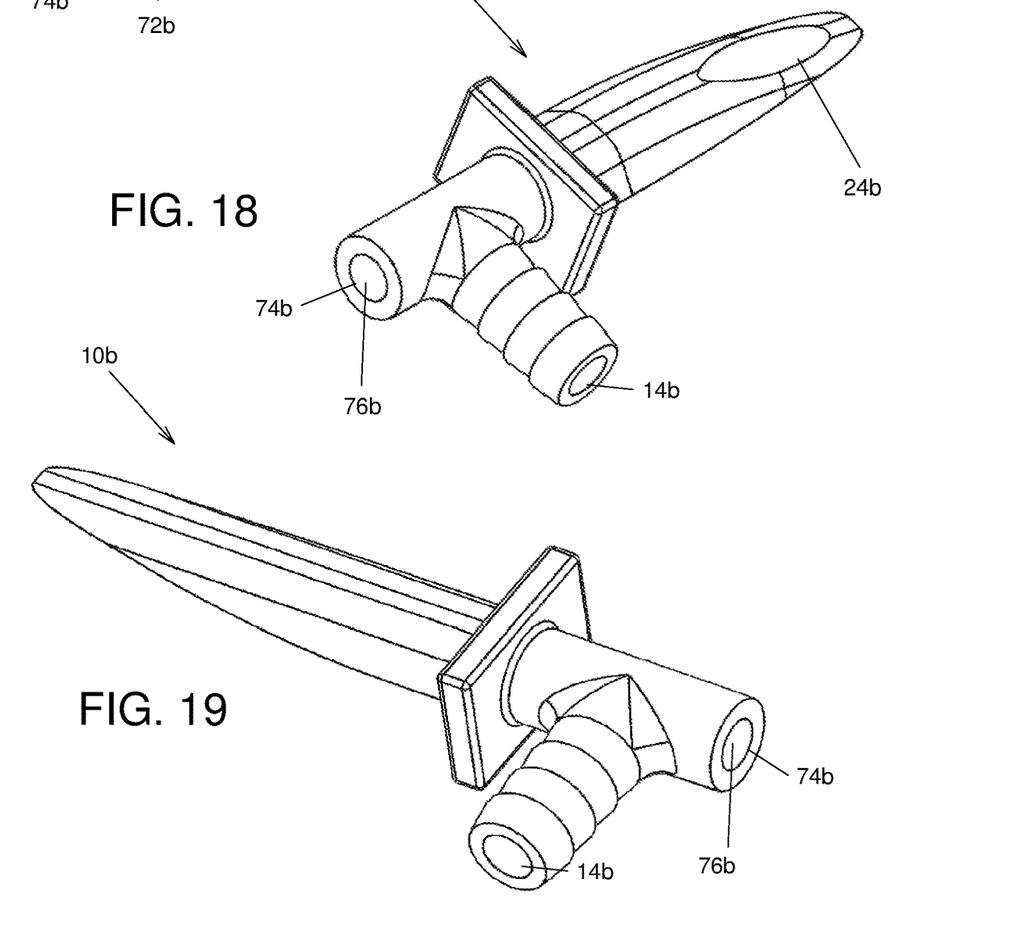
Figure 20:
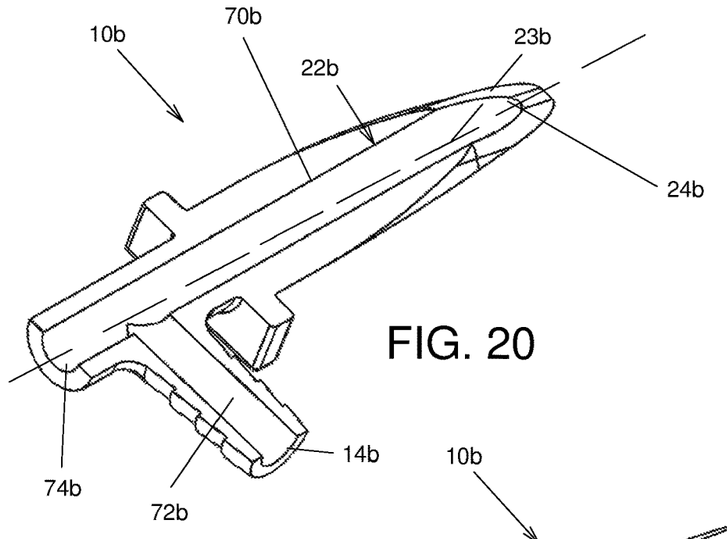

FIGS. 18 to 20 illustrate yet another example of a tree tap 10b. Referring more specifically to FIG. 20, in the tree tap 10b, the passageway 22b defines a substantially rectilinear passageway main portion 70b extending from the sap collecting aperture 24b, the passageway main portion 70b defining a passageway longitudinal axis 23b. The passageway main portion 70b is therefore similar to the passageway 22a of the tree tap 10a. However, instead of being rectilinear from the sap collecting aperture 24b to the outlet 14b, the passageway 22b also defines a passageway auxiliary portion 72b extending from the passageway main portion 70b at an angle relative thereto and leading to the outlet 14b. The tree tap 10b further defines an auxiliary aperture 74b leading substantially coaxially into the passageway main portion 70b substantially opposed to the sap collecting aperture 24b. The passageway 22b is therefore similar to the passageway 22a to which the passageway auxiliary portion 72b has been added.

It should be noted that designating portions of the passageway 22b as "main" and "auxiliary" portions does not mean that one is longer than the other necessarily, although the passageway main portion 70b is typically longer than the passageway auxiliary portion 72.

The passageway 22b is substantially L-shaped between the sap collecting aperture 24b and the outlet 14b. To that effect, the passageway auxiliary portion 72b is perpendicular to the passageway main portion 70b. However, any other angle between the passageway auxiliary portion 72b and the passageway main portion 70b is within the scope of the appended claims. Also, both rectilinear and non-rectilinear passageway auxiliary portions 72b are within the scope of the appended claims.

In some embodiments, a cap 76b for selectively obstructing the auxiliary aperture 74b is provided. The cap 76b may be in the form of a plug that obstructs the auxiliary aperture 74b when inserted thereinto, as seen in FIGS. 18 and 19. The cap 76b is removed from the auxiliary aperture 74b in FIG. 20. Typically, when sap is collected through the outlet 24b, the cap 76b obstructs the auxiliary aperture 74b. The cap 76b may be removed for cleaning the and/or sanitizing the tree tap 10b once sap collection has been completed. The cap 76b may frictionally engage the passageway 22b of may be screwed thereinto, among other possibilities. The cap 76b may also protrude from the auxiliary aperture 74b in some embodiments to facilitate removal of the cap 76b from the auxiliary aperture 74b.

EXAMPLE 4 to 5 feet long maple tree trunk segments were collected in the winter and brought at room temperature upstanding with their bottom portion in water. Trunks were tapped using conventional taps and with the tree tap 10a with and without drilling the cavity 62. Sap was collected using negative pressure provided by commercial equipment with all cases. Initially, all samples provided sap at similar rates. However, then the cavity 62 was absent, a gradual reduction in the sap flow was observed in the tree taps 10a over a period of a few days. This reduction was not observed with the tree tap 10a with the cavity 62a present.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:
1. A tree tap for collecting sap from a tree, comprising:
   a blade insertable in the tree, the blade defining at least one sap collecting aperture;

a dispenser for dispensing the sap, the dispenser defining an outlet; and an anvil provided between the blade and the dispenser, the anvil defining an impact receiving surface, the blade having at least a portion thereof that tapers in a direction leading away from the impact receiving surface;

the tree tap defining a passageway between the at least one sap collecting aperture and the outlet, the passageway defining a substantially rectilinear passageway main portion extending from the sap collecting aperture, the passageway main portion defining a passageway longitudinal axis;

wherein the blade defines a blade first surface and a blade second surface, the blade first and second surfaces merging together at a blade distal end substantially opposed to the anvil;

wherein the blade distal end is laterally offset relative to the passageway longitudinal axis, the blade first surface is substantially parallel to the passageway longitudinal axis and the at least one sap collecting aperture is defined in the blade second surface;

wherein the blade is self-penetrating so that the blade is drivable into the tree by impacting the tree tap when the blade is abutted against the tree.

2. The tree tap as defined in claim 1, wherein the passageway is substantially rectilinear between the sap collecting aperture and the outlet.

3. The tree tap as defined in claim 1, wherein the passageway also defines a passageway auxiliary portion extending from the passageway main portion at an angle relative thereto and leading to the outlet, the tree tap also defining an auxiliary aperture leading substantially coaxially into the passageway main portion substantially opposed to the sap collecting aperture.

4. The tree tap as defined in claim 3, wherein the passageway auxiliary portion extends from the passageway main portion between the sap collecting aperture and the auxiliary aperture, the passageway being substantially L-shaped between the sap collecting aperture and the outlet.

5. The tree tap as defined in claim 3, further comprising a cap for selectively obstructing the auxiliary aperture.

6. The tree tap as defined in claim 1, wherein the dispenser includes a tube through which the passageway extends, the tube extending from the impact receiving surface.

7. The tree tap as defined in claim 1, wherein the blade first and second surfaces merge together in a substantially straight edge at the blade distal end.

8. The tree tap as defined in claim 1, wherein the sap collecting aperture is proximally spaced apart from the blade distal end.

9. The tree tap as defined in claim 1, wherein the blade is configured and sized to be driven into the tree by spreading apart and deforming tree fibers without requiring removal of wood from the tree prior to being driven thereinto.

10. The tree tap as defined in claim 1, wherein the anvil defines a flange protruding transversally relative to the blade.

11. A method for driving a tree tap in a tree defining a tree outer surface, the tree tap including a blade terminating at a blade distal end, a dispenser opposed to the blade, and a passageway extending between the blade and the dispenser, the passageway being open in the blade and in the dispenser, the passageway including a substantially rectilinear passageway main portion extending from the blade, the method comprising:

abutting the blade distal end against the tree outer surface;

impacting the tree tap to drive the blade in to the tree; and drilling a cavity in the tree adjacent the blade distal end through the passageway main portion after the blade is inserted in the tree;

wherein the blade penetrates the tree by spreading and deforming tree fibers.

12. The method as defined in claim 11, wherein the blade is self-penetrating so that no aperture or recess is formed in the tree to receive the blade prior to driving the blade into the tree.

13. The method as defined in claim 11, further comprising collecting sap from the tree through the passageway.

14. A tree tap for collecting sap from a tree, comprising:

a blade insertable in the tree, the blade defining at least one sap collecting aperture; and a dispenser for dispensing the sap, the dispenser defining an outlet;

the tree tap defining a passageway between the at least one sap collecting aperture and the outlet;

an anvil provided between the blade and the dispenser, the anvil defining an impact receiving surface, the blade having at least a portion thereof that tapers in a direction leading away from the impact receiving surface; and an auxiliary blade positionable in an abutment relationship relative to the blade and anvil, the auxiliary blade being configured for being removable from the tree with the blade remaining inserted in the tree;

wherein the blade is self-penetrating so that the blade is drivable into the tree by impacting the tree tap when the blade is abutted against the tree.

* * * * *